Jan. 3, 1939.    N. M. McCULLOUGH    2,142,403
PRESSURE OPERABLE GOVERNOR ACTUATED VEHICLE SPEED CONTROL DEVICE
Filed Aug. 1, 1936
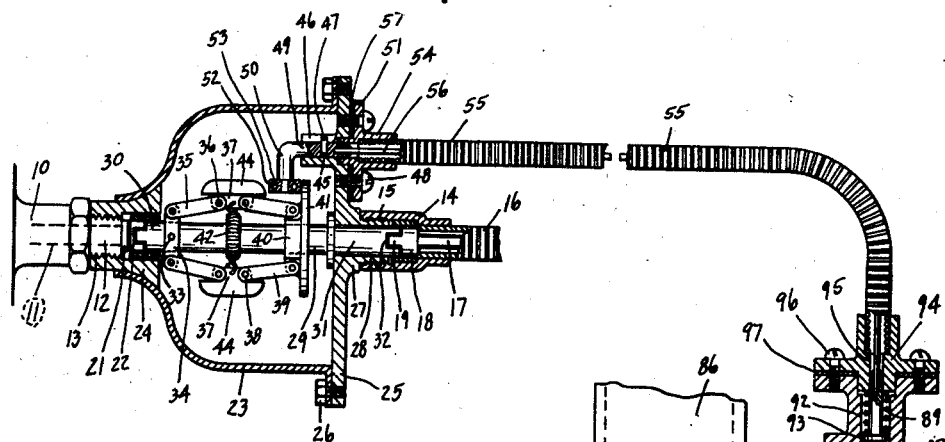
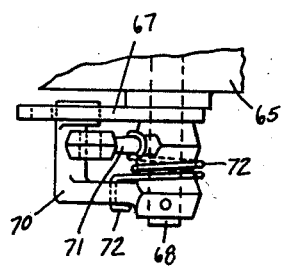
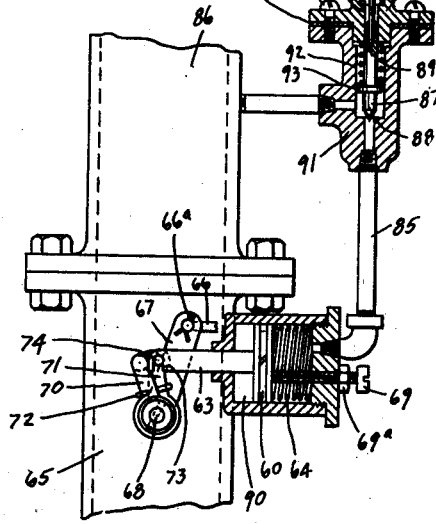
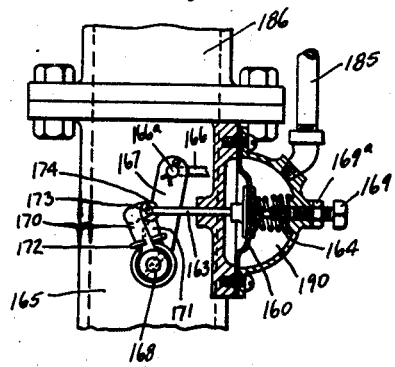
INVENTOR.
NEEL M. McCULLOUGH.
BY Lockwood Galdsmith & Galt
ATTORNEYS.

Patented Jan. 3, 1939

2,142,403

UNITED STATES PATENT OFFICE 2,142,403

PRESSURE OPERABLE GOVERNOR ACTUATED VEHICLE SPEED CONTROL DEVICE

Neel M. McCullough, Anderson, Ind., assignor to Pierce Governor Company, Anderson, Ind., a corporation Application August 1, 1936, Serial No. 93,800

8 Claims. (Cl. 180—82)

This invention relates to means for limiting the speed of an engine of a self-propelled vehicle to prevent overspeeding of the vehicle, as distinguished from regulating the speed of an engine through regulating the speed of a vehicle by means responsive to the speed of said engine. This application is a continuation in part of the copending application, entitled, "Vehicle speed engine limiting device", Serial No. 91,213, filed July 17, 1936.

This invention differs primarily from that disclosed in the before mentioned application in that the intermediate operative means is eliminated and the operation is direct. Specifically, the electrical control illustrated, described and claimed in the before mentioned application, is eliminated and the control is of a direct character.

The chief object of the invention in common with that of the copending application, as indicated by the foregoing, is to permit the engine to operate at what might be termed normal overspeed under conditions where such engine overspeeding may be desired but does not result in vehicle overspeeding.

If it be assumed that the vehicle is attempting to climb a long steep hill and is starting from rest—example, at the bottom thereof—then the engine will normally operate through intermediate or low gear speeds at a speed far in excess of the engine speed necessary to operate the vehicle up to a predetermined speed on the level when the engine is driving through what is known as high gear.

Several forms of this broad invention are illustrated herein. Each form of the invention illustrated herein, has the characteristic that the control means is responsive to the speed of the vehicle for controlling the speed of the engine of the vehicle preferably by controlling the fuel supply valve, fuel supply lever, et cetera, of the fuel supply system. In the present illustration, the means responsive to vehicle speed for controlling the engine speed is shown associated with a speedometer attachment but it is to be understood that this is merely a conventional disclosure because the means responsive to vehicle speed may be responsive thereto through any other mechanical connection and not necessarily the speedometer connection, as shown.

The full nature of the invention will be understood from the accompanying drawing and the following description and claims:

In the drawing, Fig. 1 is a diagrammatic representation of the major portion of one form of the invention, certain of the parts being shown in central section to illustrate the same and other parts in greater detail, the form of the invention illustrated being of the piston, vacuum operable, type.

Fig. 2 is a plan view of the fuel valve lever arm actuating mechanism shown in Fig. 1.

Fig. 3 is an elevational view of the immediate fuel controlling portion of the invention and a modified form thereof illustrating a diaphragm modification as distinguished from the piston modification shown in Fig. 1.

In the drawing 10 indicates a suitable portion of the vehicle and 11 a shaft constituting a part of the speedometer drive having a speed proportional to vehicle speed. Part 10 has a sleeve portion 12 threaded at 13 normally to receive the portion 14 complementarily threaded at 15, which portion 14 is associated with the tube 16 within which is mounted a shaft structure 17 terminating in a tongue drive member 18 having the tongue 19. Shaft 11 has the grooved end 21 with a groove 22 therein that normally receives tongue 19, as stated. These parts customarily are connected threadedly together and tongue and groove connected together in standard construction. However, in the present instance, a speed responsive device is interposed therebetween.

The speed responsive device of the present invention includes a housing 23 which terminates in a sleeve portion 24 interiorly threaded to receive the threaded portion 13 before mentioned. The housing is closed by the plate 25 secured thereto as at 26. Plate 25 may be supported suitably and includes a bearing 27 which is threaded exteriorly as at 28 for threaded connection with the member 14 at 15.

Shaft 29 is mounted in the housing and terminates in a tongue formed end 30 receivable by the groove 22 and an oppositely projecting grooved end 31 grooved as at 32 to receive tongue 19 of the speedometer driving member 18 or like member.

Pinned to shaft 29 as at 33 is a collar 34 and pivotally supported thereby are links 35 pivotally connected as at 36 to members 37. Members 37 are pivotally connected as at 38 to links 39 pivotally connected to a collar 40 which carries a plate or disc portion 41. Collar 40 is slidable longitudinally relative to shaft 29. Spring means 42 normally constrains the two linkages before mentioned, toward the shaft. Each member 37 carries a weight 44.

The aforesaid constitutes one form of a centrifugally operable controlling device. As the speed of the shaft, which is proportional to the speed of the vehicle, falls and rises, the plate 41—which rotates therewith—moves to the right—see Fig. 1—due to the effect of spring means 42, and moves to the left, in opposition thereto, in accordance with centrifugal force.

Plate 25 is apertured as at 45 and the aperture is defined by a collar portion which extends inwardly and has a slot or groove 46 therein. A pin 47 is slidable in said groove. Pin 47 is carried by a longitudinally slidable member 49 having an angular arm 50 which extends toward the shaft 29 and terminates adjacent the disc 41. The end of this portion 50 terminates in a roller 52 which is mounted on said portion 50 by means of an anti-friction construction 53.

As the disc 41 moves to the left it contacts the roller 52 on the end of arm portion 50 of member 49 and moves this member 49 longitudinally of its axis, and suitably associated with this member 49 is a control mechanism.

A conduit 55 encloses a wire 56 suitably secured to member 49. The conduit 55 is suitably secured to a tubular portion 54 having a plate portion 51. One or more shims 57 are interposed between plate portion 51 and the plate portion 25, the two plate portions being suitably secured together as indicated at 48. Through the use of the aforesaid shim, or shims, or the omission thereof, the position of the roller 52 relative to the disc or plate 41 may be adjusted.

Reference will now be had to the lower portion of Fig. 1 and Fig. 2. In this form of the invention 68 indicates a shaft which projects beyond the fuel passage portion 65 and lever arm 67 is rotatably supported thereby and is operated in the usual manner by the manual control rod 66 connected thereto as at 66a.

Shaft 68 has pinned to it at its outer end an angular stop 70. Between stop 70 and arm 67 is another arm 71 which is free on shaft 68 but is held against stop 70 by the spring 72. Rod 63 is notched as at 73 to receive pin 74 carried by the arm 71. The rod 63 terminates in a piston 60 constrained by spring 64 toward the left, which corresponds to the full fuel supply position. Chamber 90 in which piston 60 operates, adjustably supports a stop 69 locked by a nut 69a against which the piston bears when the valve is in the opposite fuel controlling position.

A conduit 85 communicates at one end with the cylinder 90 and at its opposite end with the intake portion 86 as shown. A valve 87 is interposed in said conduit. The seat of the valve is indicated by the numeral 88. The valve is normally constrained toward closed position by spring 89. The valve housing 91 is bored as at 92 to nest said spring, the valve 87 having the collar portion 93 thereon and in said portion 92 and against which bears one end of the spring.

A cap 94 is provided with an opening 95 therein through which extends the flexible wire 56, said wire being secured to the valve member. The other end of the flexible cable 55 is also secured to the valve cap member 94. The valve cap member is associated suitably with the valve body 91 as by the screws 96 and the position of the valve with reference to its seat, is determined by the shim, or shims, or the omission thereof, one shim being illustrated herein and indicated by the numeral 97.

From the foregoing the operation of the device will be understood as follows: As the vehicle speed increases above that for which the governor construction has been set, as determined by the spring 42 and the initial positioning of the roller 52, the plate 41 contacts the roller as the plate moves to the left and then the roller rolls with the plate in the rotation thereof and continued movement to the left of the plate 41 causes longitudinal movement of member 49, which is transmitted to the valve 87 by means of the flexible wire 56. This unseats valve 87 and the vacuum of the engine applied to the intake 86 is communicated to the cylinder chamber by pipe 85 and this serves to draw the piston 60 in opposition to spring 64 into the position shown in Fig. 1, wherein said piston abuts the end of the adjustable stop 69. This movement thus insures a decrease in fuel supply to the engine through operation of the control as applied to the valve shaft 68. As long as the vehicle overspeed condition continues, fuel restriction will continue and when vehicle overspeeding ceases, then fuel restriction ceases.

The spring 89 is sufficiently strong to seat the valve 87 and to return member 49 to its original adjusted position after the vehicle speed has decreased below the critical speed and plate 41 has moved to the right. It is not necessary for operative condition, that roller 52 always contact plate 41. In fact, it is preferred in order to reduce wear of the several parts, that roller 52 does not contact plate 41 at any time except when overspeeding occurs. If desired, an additional spring may be utilized to return the member 50 to its original position. In this event, naturally, centrifugal force would have to overcome the effect of that spring as well as spring 89, before mentioned.

In further explanation of the operation of the lever arm arrangement and the control secured thereby, it may be stated that when increased vehicle speed is desired and under normal speed operation, movement of arm 67 counterclockwise secures an increased fuel supply because member 67 engages stop 71 and to this is secured shaft 68 carrying the fuel controlling valve.

When the vehicle exceeds the predetermined speed, the rod 63 is moved to the right, as before stated, carrying lever 71 with it, which moves, through spring 72, stop 70 to the right and lever 67 moves therewith to reduce the fuel supply. Thus the overspeed control is inoperative for fuel control purposes for speeds below the desired vehicle speed. At or above the critical maximum vehicle speed the control is operative to insure reduction of fuel supply and this prevents overspeeding of the vehicle.

In Fig. 3 of the drawing, there is illustrated a modified form of the invention and modified to this extent, that in place of the piston type actuation for rod 63, there is provided a diaphragm type actuation. Only the fuel control and diaphragm type mechanism is disclosed in this figure, it being understood that for all practical purposes, the conduit 185 in Fig. 3 may be substituted for the conduit 85 in Fig. 1. Similar numerals of the one hundred series indicate like or similar parts in this figure.

The basic invention, therefore, is directed to a centrifugally operable device responsive to the speed of the vehicle for controlling the fuel supply to the engine of that vehicle to prevent speeding of the engine above that necessary to produce predetermined maximum vehicle speed but which is so arranged it permits the engine to overspeed whenever required so long as the vehicle speed is not above that for which the control device is set or adjusted and beyond which the vehicle is not intended to travel.

As before stated, the illustration of the speed responsive mechanism associated with and interposed between and detachably connected in the speedometer drive, is merely a conventional disclosure of a practical application for showing a vehicle speed responsive drive for the control device.

While the invention has been described in great detail in the foregoing specification, the same is to be considered as illustrative and not restrictive in character. But one form of centrifugally operable device is illustrated. Other forms, as has been suggested hereinbefore, may be readily substituted for that specifically shown. The specific form illustrated, however, does have the advantage that it may be associated with standard types of constructions now employed and may be readily inserted or interposed between the speedometer drive connection to the transmission and the speedometer drive per se. Also, it is to be understood, that in place of vacuum being the operating medium for actuating the control member to secure the desired fuel valve control movement, pressure may be substituted therefor without departing from the broader features of the invention. Various modifications hereinbefore illustrated, described and/or mentioned as well as others which will readily suggest themselves to persons skilled in this art, all are considered to be within the broad scope of the invention, reference being had to the appended claims.

The invention claimed is:—

1. In a vehicle speed control device, the combination of a centrifugally operable device responsive to vehicle speed including a loading spring and a rotatable and axially movable disk, an angular member adjacent thereto and longitudinally movable, the angular end being operatively engageable and movable by the disk at predetermined vehicle speed, a fuel supply control structure including a conduit including a valve body, a valve therein, means normally constraining said valve toward one position independent of the loading spring for controlling pressure variation in the conduit, and means connecting said valve and angular member for simultaneous movement of the valve in opposition to the constraining means when the angular member is operatively engaged and moved by the disk.

2. A device as defined by claim 1 characterized by spring means associated directly with said valve and constituting the aforesaid constraining means.

3. A device as defined by claim 1, characterized by the addition of an adjustable support for the angular member for adjusting the critical vehicle speed at which the angular member is operatively engaged by the disk.

4. A device as defined by claim 1, characterized by the addition of a conduit adjustably and operatively interposed between the valve body and the centrifugally operable device and enclosing said connecting means.

5. A device as defined by claim 1, characterized by the addition of a conduit adjustably and operatively interposed between the valve body and the centrifugally operable device and enclosing said connecting means, and spring means associated directly with said valve and constituting the aforesaid constraining means.

6. In a device of the character described, the combination of a member for controlling the fuel supply of the engine of a vehicle, means responsive to the vehicle speed, and other means operable by the first mentioned means at the desired vehicle speed for actuating said member and other than of electrical character, said other means including a valve member, a conduit operatively associated with pressure means on the vehicle, means responsive to pressure variation in the conduit controlled by the valve member and operatively connected to the first mentioned member, the pressure variation responsive means being of the vacuum operable type and operable in one direction only by vacuum variation, and means normally constraining the vacuum operable means toward the opposite direction.

7. In a device of the character described, the combination of a member for controlling the fuel supply of the engine of a vehicle, means responsive to the vehicle speed, and other means operable by the first mentioned means at the desired vehicle speed for actuating said member and other than of electrical character, said other means including a valve member, a conduit operatively associated with pressure means on the vehicle, means responsive to pressure variation in the conduit controlled by the valve member and operatively connected to the first mentioned member, the pressure variation responsive means being of the piston type and operable in one direction only by pressure variation, and means normally constraining the piston type means toward the opposite direction.

8. In a device of the character described, the combination of a member for controlling the fuel supply of the engine of a vehicle, means responsive to the vehicle speed, and other means operable by the first mentioned means at the desired vehicle speed for actuating said member and other than of electrical character, said other means including a valve member, a conduit operatively associated with pressure means on the vehicle, means responsive to pressure variation in the conduit controlled by the valve member and operatively connected to the first mentioned member, the pressure variation responsive means being of the diaphragm type and operable in one direction only by pressure variation, and means normally constraining the diaphragm type means toward the opposite direction.

NEEL M. McCULLOUGH.